United States Patent
Radimirsch et al.

(10) Patent No.: US 7,170,884 B1
(45) Date of Patent: Jan. 30, 2007

(54) METHOD FOR SYNCHRONIZATION

(75) Inventors: Markus Radimirsch, Laatzen (DE); Karsten Brueninghaus, Salzgitter (DE); Urs Luebbert, Rosengarten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/937,608

(22) PCT Filed: Mar. 28, 2000

(86) PCT No.: PCT/DE00/00915

§ 371 (c)(1),
(2), (4) Date: Mar. 1, 2002

(87) PCT Pub. No.: WO00/60805

PCT Pub. Date: Oct. 12, 2000

(30) Foreign Application Priority Data

Mar. 30, 1999 (DE) ................ 199 14 600

(51) Int. Cl.
*H04J 3/06* (2006.01)

(52) U.S. Cl. ................ 370/350; 370/509

(58) Field of Classification Search ......... 370/208, 370/210, 350, 509–514, 516; 375/349, 362
See application file for complete search history.

(56) References Cited

U.S. PATENT DOCUMENTS 5,372,113 A * 12/1994 Smith .............. 123/470
5,532,585 A 7/1996 Oudet et al.
5,732,113 A * 3/1998 Schmidl et al. .......... 375/355
5,809,083 A * 9/1998 Wright ................ 375/285
6,654,429 B1 * 11/2003 Li ..................... 375/316

FOREIGN PATENT DOCUMENTS

| DE | 29 23 644 | 12/1979 |
| DE | 44 46 639 A | 7/1996 |
| DE | 197 38 316 A1 | 3/1999 |
| EP | 0 529 421 A | 3/1993 |
| WO | 96 02990 A | 2/1996 |

OTHER PUBLICATIONS

Pierre R. Chevillat et al: "Rapid Training of a Voiceband Data-Modem Receiver . . . " IEEE Transactions on Communications, vol. COM-35, No. 9, Sep. 1987, pp. 869-876 (In English).
Mueller-Weinfurtner et al: "Analysis of a Frame- And . . . " Proceedings of the 7-th CTMC at IEEE Globecom in Sydney, 1998, pp. 201-206 (In English).
W. Zou et al: "COFDM: An Overview", IEEE Transactions on Broadcasting, vol. 41, No. 1, Mar. 1995, pp. 1-8 (In English).
Stefan H. Mueller-Weinfurtner: "On the Optimality of Metrics . . . " IEEE 1998, pp. 533-537 (In English).

* cited by examiner

*Primary Examiner*—Ricky Q. Ngo
*Assistant Examiner*—Richard Chang
(74) *Attorney, Agent, or Firm*—Michael J. Striker

(57) ABSTRACT

For synchronizing one or more receivers (E) to a transmitter (S) within a transmission system, the transmitter (S) inserts a special synchronization train into the data stream. The synchronization train is formed of at least two different symbol sequences (A, B), which are transmitted periodically in alternation.

18 Claims, 2 Drawing Sheets

METHOD FOR SYNCHRONIZATION

CROSS-REFERENCE TO A RELATED APPLICATION

The invention described and claimed hereinbelow is also described in German Patent Application DE 19914600.4 filed on Mar. 3, 1999. This German Patent Application, whose subject matter is incorporated here by reference, provides the basis for a claim of priority of invention under 35 U.S.C. 119(a)–(d).

BACKGROUND OF THE INVENTION

The invention is based on a method for synchronizing one or more receivers to a transmitter within a transmission system, using a data stream with guard intervals, in particular for compensating for multi-path propagation, and on a transmitter for preparing a synchronization train and a receiver for evaluating this synchronization train, and on a communications system.

It is assumed for instance that one transmitter serves one or more receivers. The transmitters sends one or more packets to the receivers at the same instant.

In a transmission system, which in particular uses OFDM (Orthogonal Frequency Division Multiplexing), the problem of synchronization arises. In OFDM transmission, the transmission symbols are modulated over a plurality of subcarriers in the frequency range by a generally digital type of modulation [1]. The subcarriers are then transformed into the time range together by an IFFT (Inverse Fast Fourier Transformation) and then transmitted.

In the receiver, it is necessary to reconstruct some information by way of the signal transmitted, especially to reconstruct the beginning of the block and the center frequency error.

To ascertain the beginning of the block, the chronological position of the signal to be received must be known. For this purpose, a two-stage method is usually used, according to which first a coarse and then a fine detection of the beginning of the block are performed in succession.

In the normal situation, the receiver has a center frequency error compared to the sensor. In the case of OFDM, this error is especially critical, because it can cause a disruption of orthogonality, which leads to increased bit errors. The frequency synchronization serves to correct this frequency difference.

In a communications system with transmission of relatively short data packets, to achieve a synchronization, two identical synchronization symbols, especially OFDM symbols, are made to precede a transmission burst in accordance with [2], [3] and [4], and these are transmitted twice with a predetermined spacing. The position of these signals can be determined by evaluation of the metrics.

To avoid intersymbol interferences (ISI), a guard interval is often inserted into the transmitter in conjunction with the OFDM transmission technique, the length of which guard interval is adapted to the duration of the channel pulse response. In order for there not to be any actual disruption in the receiver from chronologically adjacent symbols, the instant of synchronization, that is, the onset of the ISI-free signal portion, is ascertained before the data evaluation in the receiver. The ascertainment of this instant is called block or symbol synchronization. When the pulse response of the present channel is shorter than the guard interval, the block synchronization need not ascertain the beginning of the ON state precisely; instead, the result is an allowable synchronization interval.

SUMMARY OF THE INVENTION

It is therefore an object of the present invention to provide a method for synchronization, in which the precision of synchronization can be improved considerably over known methods. While the known methods can actually be used only for coarse block synchronization, the method according to the invention offers quite precise results both in terms of fine block estimation and frequency estimation. The embodiment according to the invention is advantageously suitable as a transmission method for OFDM. If a coherent demodulation is provided, then the synchronization train can be used for block synchronization, and estimating the center frequency error can also be used to estimate the channel pulse response.

The effort and expense for implementing the method of the invention is hardly higher than in known methods but provides increased accuracy of the estimate, especially of the center frequency error.

The method according to the invention, and a corresponding transmitter and receiver, are advantageously suitable for use in radio systems, specifically in normal bidirectional communications systems with variable distribution of the roles if transmitter and receiver and in broadcasting systems, in which the roles of transmitter and receiver are static over time.

As a transmission medium, not only radio but also a line connected transmission can be provided, for instance via coaxial cable or a shielded or unshielded pair of conductors in a line network. In hybrid communications systems as well, that is, systems with radio components, line-connected components, and/or light source conductor components, the invention can advantageously be used.

OFDM is especially suitable as the type of modulation. But even in systems without OFDM, where transmission methods are used in which a guard interval is provided to compensate for multi-path propagation, the invention can advantageously be employed.

BRIEF DESCRIPTION OF THE DRAWINGS

In conjunction with the drawings, exemplary embodiments will be explained in further detail. Shown are.

DESCRIPTION OF THE PREFERRED EMBODIMENTS

Before the actual embodiment according to the invention will be addressed, for the sake of better comprehension synchronization according to the prior art will be explained. For the following observations, it will be assumed that in FIG. 1 a transmitter S of a subscriber serves a plurality of receivers E1, E2, E3 of other subscribers.

The transmitter S of a subscriber sends one or more data packets to the receivers E1, E2, E3 at one instant; the duration of the packets can be either constant or variable. The situation can generally also change in such a way that one of the subscribers later switches over dynamically from the reception mode to the transmission mode, and a transmitting subscriber and/or the other receiving subscribers then operate in the reception mode.

It is also assumed that OFDM is used as the transmission method; see [1], [3], [4]. To that end, the transmission symbols over a plurality of subcarriers are modulated in the frequency range by a generally digital type of modulation. The subcarriers are then transformed into the time range together by an IFFT (Inverse Fast Fourier Transformation) and then transmitted.

Since in a communication system only short data packets are transmitted, fast synchronization is urgently needed. This can be achieved only with the aid of a special synchronization symbol, which is made to precede the data packet in the transmitter.

Figure 2:
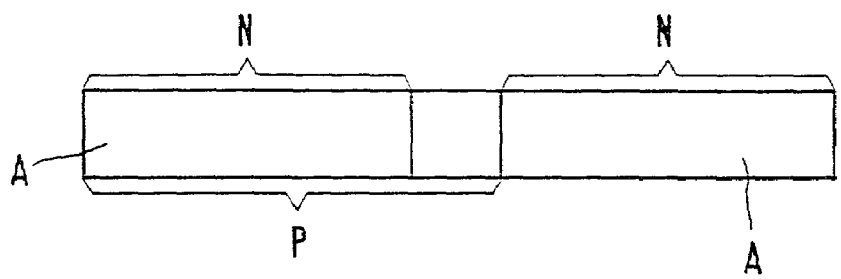
FIG. 2, the makeup of a synchronization train according to the prior art.

One known method of block synchronization, found in sources [2] and [3], is to evaluate a signal $A=\{r_i\}$ of length N, which is transmitted twice at the spacing P; see FIG. 2. The position of this signal can be determined by evaluation of the metrics:

$$\lambda(i, N, P) = \min_{\phi}\left\{\sum_{l=0}^{N-1} |r(i+j) - r(l+j+P)e^{j\phi}|^2\right\}$$

$$= \min_{\phi}\left\{\sum_{l=0}^{N-1} |r(i+j)|^2 + |r(i+j+P)|^2 - 2\mathrm{Re}\{r(i+j)r(i+j+P)e^{-j\phi}\}\right\}$$

$$= \sum_{l=0}^{N-1}\left[|r(i+j)|^2 + |r(i+j+P)|^2\right] - 2\left|\sum_{l=0}^{N-1} r(i+j)r(i+j+P)\right|$$

$$= E(i, N, P) - 2|w(i, N, P)|.$$

The criterion for the beginning of the block is indicated by the index i, at which the metrics have their minimal phase:

$$i_{Start} = \arg \min_i \lambda(i, N, P)$$

The block synchronization in the OFDM should, on the basis of the periodic preamble, indicate the interference-free range of the subsequent data blocks. To that end, the correlation window is shortened relative to the sequence length by the length of the guard interval.

This method described above is actually used for coarse block synchronization. In principle, it therefore offers only quite imprecise results, in terms of both fine block estimation and frequency estimation.

Figure 1:
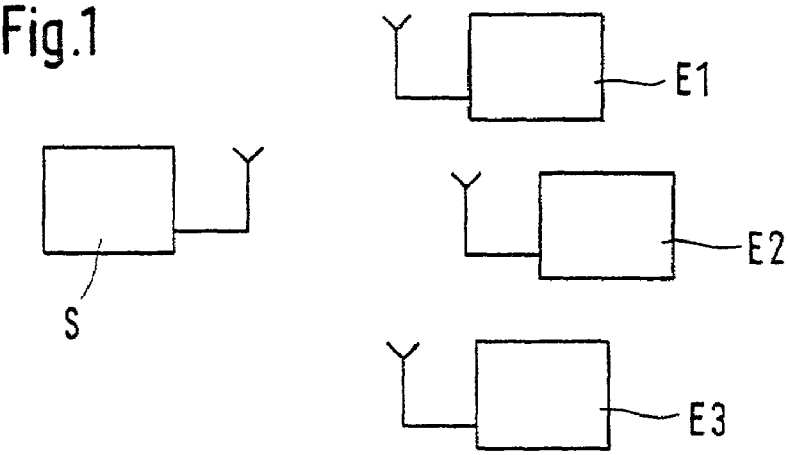
FIG. 1, a radio network with one transmitter and a plurality of receivers.
Figure 3:
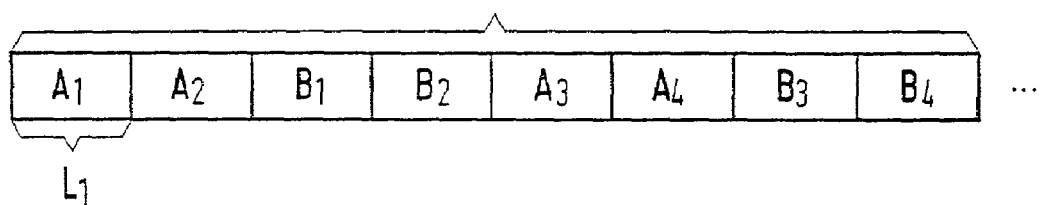
FIG. 3 the makeup of a synchronization train according to the invention.

The transmitter S of FIG. 1 inserts a special synchronization train, especially at the beginning of transmission, into the data stream; in the receiver, this sequence serves to estimate the chronological position of the signal to be received, and/or to estimate the center frequency error between the transmitter and the receiver. The synchronization train is formed according to the invention as follows:

two different symbol sequences A and B of the same length $L_1$ with ideally favorable autocorrelation properties are selected. In the case of OFDM, these can be OFDM symbols, which have the same length as or a different length from a normal data symbol;

the two symbol sequences A and B are always transmitted in such a way that in alternation, A is transmitted twice and B is transmitted twice, as in FIG. 3. The indexes for the symbol sequences A and B indicate the occurrence of the trains A and B.

The chronological position of the signal to be received between the transmitter S and receiver E is ascertained from a composite term, in particular the total metrics, of the various symbol sequences, in this case the pairs of symbol sequences, within a predetermined interval.

Then in the receiver the total metrics $\lambda_2$, from the sum of individual metrics $\lambda$ over all the identical sequence pairs $(A_l, A_m)$ and $(B_l, B_m)$, where $1 \leq l$, $m \leq M$ and $m >$, become the following:

$$\lambda_s(i) = \sum_{(A_l,A_m)\in\lambda 1_A} \lambda(i+S(A_l, A_m), L_1, \Delta(A_l, A_m)) +$$

$$\sum_{(B_r,B_m)\in\lambda 1_B} \lambda(i+S(B_r, B_m), L_1 \Delta(B_r, B_m))$$

In this equation, s (X,Y) designates the relative starting index for the signal interval X, and $\Delta$ (X,Y) designates the spacing between the two pairs of signals X,Y.

Whichever index $I_{start}$ that minimizes the metrics $\lambda_S$ within an interval $I_{RS}$ predetermined by the frame synchronization is selected as the beginning of the block:

$$i_{Start} = \arg \min_{i \in I_{AS}} \lambda_s(i).$$

In the frequency estimation, the problem arises that the phase rotation between two identical symbols $(A_1, A_m)$ and $(B_1, B_m)$ can exceed 360°, so that the resultant multivalence must first be solved. As the reference frequency fref for this, the estimated frequency position $f_o$ from the phase rotation $\Phi_{01}$ of two adjacent periodic segments each must be used, since here the capture range, where $|f_o| < f_a/(n L_1)$ is greatest:

$$f_{rej} = \hat{f}_{ul} = \frac{f_0 + \hat{\varphi}_{01}}{2\pi L_1}$$

where $$\hat{\varphi}_{01} = \arg\left\{ \sum_{l=1,3,5...}^{M-1} w(i_{Start} + S(A_l + A_{l+1}), L_1, L_1) + w(i_{Start} + S(B_l, B_{l+1}), L_1, L_1) \right\}.$$

To achieve the most secure possible frequency estimation, once again the phase rotations for all the other pairs of intervals $(A_1, A_m)$ and $(B_1, B_m)$ must be taken into account. Let $M_{A\delta<MA}$ be the set of all the pairs $(A_1, A_m)$ and $(B_1, B_m)$ with the same spacing $\Delta(A_1, A_m)$ and $\Delta(B_1, B_m)$ and let $\delta_{max}$ be the number of different sets $M_{A/B\delta 1}$, then the overall result for the estimated value of the center frequency error $f_o$ is:

$$\hat{f}_o = \sum_{\delta=1}^{\delta_{nr}} c_\delta \cdot \hat{f}_{o\delta} = \sum_{\delta=1}^{\delta_{max}} c_\delta \frac{f_a, \hat{\varphi}_{o\delta} \cdot e^{-jr(\phi_{at},\phi_{o\delta})}}{2\pi\delta(A_l A_m \equiv M_{A,\delta})}$$

where $$\phi_{o\delta} = \arg\left\{ \sum_{(A_l, A_m)\in\lambda 1_A} w(i_{Start} + S(A_l, A_m), L_1, \Delta(A_l, A_m)) + \sum_{(B_r, B_m)\in\lambda 1_B} w(i_{Start} + S(B_r, B_m), L_1, \Delta(B_r, B_m)) \right\}$$

The coefficients $c_\delta$ are weighting factors, with which the different noise, levels, which are superimposed on the estimated phase values, are taken into account. They result on the one hand from the number of sequence pairs that are taken into account and on the other from the spacing (X,Y) of the frequency pairs. The function [paste in, page 9, line 4] solves the multivalence of the phase [ditto, line 5] on the basis of the estimated phase value [ditto, line 6] ascertained beforehand.

According to the invention, the symbols indicated can also be used for channel estimation, if they are known in the transmitter and the receiver. To that end, the synchronization symbols, once the frequency correction has been done, are FFT-processed in the receiver, and the amplitude weights and phase weights of the individual subcarriers are determined. If the synchronizing signals (A and B) are shorter than a normal OFDM symbol, then the phase weights and amplitude weights of the subcarriers not transmitted must be ascertained by interpolation. The fact that a plurality of known synchronizing symbols are used can be exploited for the sake of averaging the channel parameters over the known symbols, so as to increase the accuracy of the channel estimation.

Figure 4:
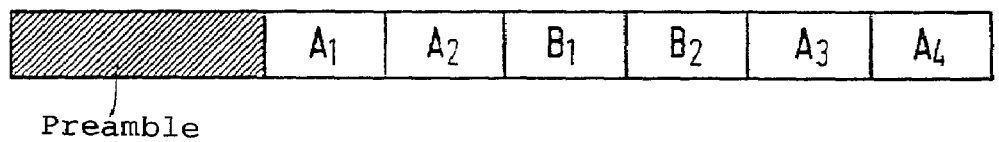
FIG. 4, the makeup of a synchronization train with a preamble.

It should now be assumed that the transmitter places a preamble in accordance with FIG. 4 before each synchronization train. The synchronization train according to the invention is preceded by a preamble that serves to set the gain control of the receiver correctly, in order to fully modulate the analog-to-digital converter. The ensuing synchronization symbol comprises the sequence AABBAA.

The metrics for the block synchronization in this case are calculated as follows:

$\lambda_S(i)=\lambda(i,L_1,L_1)+\lambda(i, L_1,4L_1)+\lambda(i+L_1L_1,3L_1, 3L_1)$ $+\lambda(i+L_1,L_1,4L_1)+\lambda(i+4L_1,L_1,L_1)+\lambda(i+2L_1,L_1,L_1)$ The individual metrics corresponds to the pairs $(A_1, A_2)$, $(A_1, A_3)$, $(A_1, A_4)$, $(A_2, A_3)$, $(A_2, A_4)$, $(B_1, B_2)$. The starting value for the block is:

$I_{start}=\arg \min_i\lambda_S(i)$

For the frequency synchronization, the center frequency error $f_o$ is calculated as follows:

$\phi_{u1}=\arg\{w(i_{start},L_1,L_1)+w(i_{start}+2L_1,L_1,L_1)+W(i_{start}+4L_1,L_1,L_1)\}$, $\phi_{u2}=\arg\{w(i_{start},L_1,4L_1)+w(i_{start}+l_1,L_1,4L_1)\}$ $$\hat{f}_o = \frac{F_o}{2\pi}\left( c_1\frac{\hat{\varphi}_{01}}{L_1} + c_2\frac{\hat{\varphi}_{02}e^{-jr(\hat{\varphi}_{a1},\hat{\varphi}_{a1})}}{4l_1} \right)$$

Figure 5:
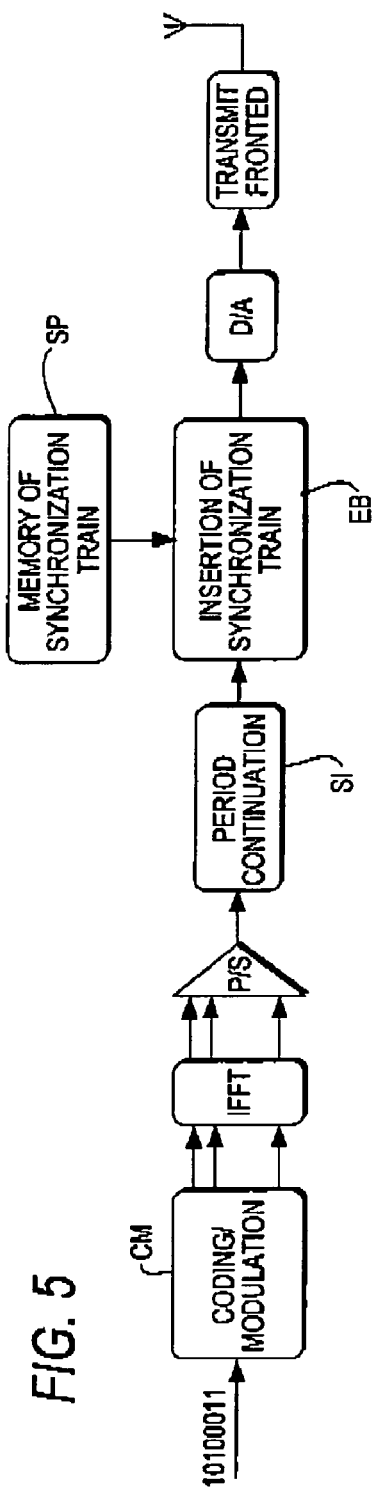
FIG. 5, a block circuit diagram of a transmitter according to the invention.

One possible realization of the transmitter is shown in FIG. 5. An OFDM transmitter, that is, its coding and modulating device CM, is supplied with a bit train. The usual processing by IFFT (Inverse Fast Fourier Transformation), parallel-serial conversion P/S, and the insertion of the guard interval SI follows by periodic continuation (see source [1]). Next, at the beginning of each transmission, the synchronization train is read out of a memory SP and inserted, together with the preamble of FIG. 4, by means of the insertion device EB. The signal is converted from digital to analog (D/A) and transferred to the transmission front end SF, where it is optionally highly mixed into a different frequency position and is transmitted via an antenna. In the version of FIG. 5, the insertion of the synchronization train is done in accordance with the IFFT, so that in the memory SP, the time signal of the synchronization train must be present. Under certain conditions, however, it is equally possible to insert the synchronization train before the IFFT and have it processed by the IFFT.

Figure 6:
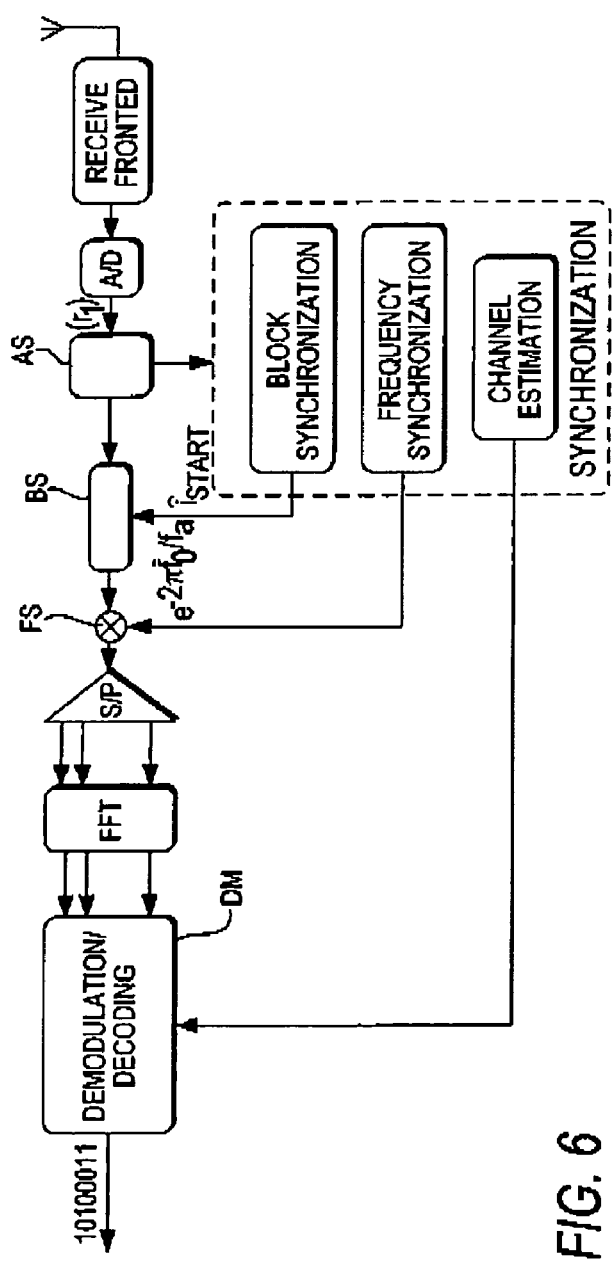
FIG. 6, a block circuit diagram of a receiver according to the invention.

One possible version of the receiver is shown in FIG. 6. In the receiver, the signal, mixed into the base band and converted from analog to digital, reaches a sampling memory AS. The synchronizing device SY can access this sampling memory AS in order to perform the block synchronization, frequency synchronization, and channel estimation. Once the block synchronization has been successfully performed, a window-forming unit BS is addressed, which reads the correct values out of the sampling buffer memory. Next, a frequency correction is performed in the mixing device FS with the center frequency error ascertained. After the serial-parallel conversion S/P and the FFT processing, the channel parameters ascertained from the channel estimation are used for demodulation and decoding DM.

Next, alternatives for realizing the method of the invention will be presented:

in the method for calculating the total metrics, it is also possible not to take all the possible pairs into account. In the exemplary embodiment, the calculation prescription for the block synchronization would for instance change as follows:

$\lambda_S(i)=\lambda(i,L_1,L_1)+\lambda(i,L_1,4L_1)+\lambda(i+L_1,L_1,4L_1)+\lambda(i+L_1,L_1,2L_1,L_1,L_1)$ The individual metrics would in this case correspond to the pairs $(A_1, A_2)$, $(A_1, A_3)$, $(A_2, A_4)$, $(A_3, A_4)$, $(B_1, B_2)$.

It is equally possible in the method for calculating the center frequency error to use only some of the possible angle errors in calculating the equation for $\Phi_{o\delta}$.

Under some circumstances, it is favorable to insert guard intervals before the individual frequency pairs. If S is a guard interval of arbitrary length (in general, the periodic continuation of a symbol), the result is thus for example the trains SAASBBSAA. The calculation prescriptions described above logically apply, and the guard intervals are not evaluated.

By the method described above, the signal trains A and B are each transmitted in pairs a plurality of times in succession. The method for block and frequency synchronization can be analogously used if the signal trains occur individually one after the other, such as the train ABAB. It is equally possible for the trains A and B not be inserted in pairs but each more than twice. One example of a train for a triple occurrence each time would be AAABBBAAA. The calculation prescriptions given above logically apply.

It is furthermore possible to use more than two different signal trains, such as three different signal trains A, B and C. The rule in this case would be that at least one signal train is put together as a pair, with a spacing of more than one further pair of other signal trains, to make a synchronizing symbol.

It is also possible to transmit the various signal trains not directly in succession but rather with a certain spacing from one another.

The method presented is based on the fact that the various signal trains each have the same length. It is also possible to use different signal trains A and B that have different lengths. The calculation prescriptions logically apply and must be adapted in detail for this purpose.

Literature:

[1] W. Zou, Y, Wu, "COFDM: an Overview", IEEE Transactions on Broadcasting, Vol. 41, No. 1, March 1995

[2] Chevillat, P. R., Mainwald, D., Ungerboeck, G. (1987), Rapid Training of a Voiceband Data-Modem Receiver Employing an Equalizer with Fractional-T Spaced Coefficients, IEEE Transactions on Communications 35(9), 869–876

[3] Müller-Weinfurtner, S. H. (1998), On the Optimality of Metrics for Coarse Frame Synchronization in OFDM: a Comparison, 9th IEEE PIMRC '98

[4] Müller-Weinfurtner, S. H. Rüβler, J. F., Huber, J. B. (1998), Analysis of a Frame- and Frequency Synchronizer for Bursty OFDM, Proceedings of the 7th CTMC at IEEE Globecom '98, pp.201–206.

The invention claim is:

1. A method of synchronizing at least one or more receivers to a transmitter within a transmission system with the use of a data stream with guard intervals, comprising the steps of inserting with the transmitter a special synchronization train into the data stream at a beginning of a transmission, said special synchronization train estimating a chronological position of a signal to be received and/or estimating a center frequency error between the transmitter and the receiver; forming the synchronization train of at least two different symbol sequences which are transmitted in alternation periodically; ascertaining the chronological position of the signal and/or the center frequency error between the transmitter and the receiver from a composite term of various symbol sequences within a predetermined interval; for a block synchronization using total metrics of at least two different symbol sequences used as the synchronization train; and selecting as a beginning of a block, whichever index minimizes the total metrics within the predetermined interval.

2. A method as defined in claim 1; and further comprising providing in an OFDM transmission symbol the symbol sequences comprising OFDM symbols, which have same lengths as or different lengths from a conventional data symbol.

3. A method as defined in claim 1; and further comprising transmitting the symbol sequences at least in pairs in each case in alternation.

4. A method as defined in claim 1, wherein when there are more than two different symbol sequences, further comprising putting at least one symbol sequence as a pair together with a spacing from at least one further pair of another symbol sequence to form the synchronization train.

5. A method as defined in claim 4; and further comprising providing guard intervals in front of the individual pairs of symbol sequences.

6. A method as defined in claim 1; and further comprising, for a block synchronization, using total metrics of at least two different symbol frequencies used as the synchronization train, and as a beginning of a block selecting whichever index minimizes the total metrics within the predetermined interval.

7. A method as defined in claim 1; and further comprising determining the predetermined interval by a frame structure of the data stream.

8. A method as defined in claim 1; and further comprising for estimating the center frequency error, ascertaining a phase rotation of two adjacent identical signal segments at a time.

9. A method as defined in claim 8; and further comprising ascertaining phase rotations of other identical signal portions, and estimating a total center frequency error by averaging via the phase rotations thus obtained.

10. A method as defined in claim 1; and further comprising utilizing the symbol sequences for channel estimation for a coherent demodulation, in that the symbol sequence after a frequency correction has been performed is subjected in the receiver to a fast Fourier transformation, and determining amplitudes and phase weights of individual subcarriers.

11. A method as defined in claim 10; and further comprising estimating channel parameters by averaging various symbol sequences.

12. A method as defined in claim 1; and further comprising preceding the synchronization train by a preamble which is sued to adjust an amplitude control of the receiver.

13. A transmitter for preparing a synchronization train for at least one receiver within a transmission system with use of a data stream with guard intervals for compensating for multi-path propagation, the transmitter comprising a first device selected from the group consisting of a coding device and a modulating device; insertion device configured for insertion of a synchronization train, said special synchronization train estimating a chronological position of a signal received and/or estimates a center frequency error between the transmitter and a receiver and said special synchronization train being formed of at least two different symbol sequences, said insertion device being embodied such that an alternating, periodic insertion of the synchronization train into the data stream prepared by said first device is performed; memory device operatively connected to said insertion device for various symbol sequences and for their linkage; and means for evaluating the various symbol sequences to gain their metrics and to ascertain the chronological position fo the signal and/or the center frequency error between the transmitter and the receiver, and selecting as a beginning of a block an index for minimizing the total metrics within a predetermined interval in view of block synchronization.

14. A receiver for receiving and evaluating a synchronization train which is transmitted by a transmitter within a transmission system with use of a data stream with guard intervals to compensate for multi-path propagation, the receiver comprising a sampling memory for a received data stream; a synchronization evaluation device which is operatively connected to said sampling memory and is configured for evaluating a synchronization train said special synchronization train estimating a chronological position of a signal to be received and/or estimating a center frequency error between a transmitter and the receiver and said special synchronization train being formed of at least two different symbol sequences that can be transmitted periodically in alternation with respect to a chronological position and/or a center frequency error within a predetermined interval, and for controlling corresponding reception units for block synchronization, frequency synchronization and/or channel estimation; and means for evaluating the various symbol sequences to gain their metrics and to ascertain the chronological position of the signal and/or the center frequency error between the transmitter and the receiver, and selecting as a beginning of a block an index for minimizing the total metrics within a predetermined interval in view of block synchronization.

15. A communication system using the method of synchronizing at least one or more receivers to a transmitter within a transmission system with the use of a data stream with guard intervals, comprising the steps of inserting with the transmitter a special synchronization train into the data stream at a beginning of a transmission said special synchronization train estimating a chronological position of a signal to be received and/or estimating a center frequency error between the transmitter and the receiver; forming the synchronization train of at least two different sequences which are transmitted in alternation periodically; ascertaining the chronological position of the signal and/or the center frequency error between the transmitter and the receiver from a composite term of various symbol sequences within a predetermined interval; for a block synchronization using total metrics of at least two different symbol sequences used as the synchronization train; and selecting as a beginning of a block, whichever index minimizes the total metrics within the predetermined interval and embodied as a radio communication system, a line-connected communication system, or a hybrid communication system with radio components, optical waveguide components and/or line-connected components, said communication system including one transmitter and one receiver assigned to subscribers, with variable transmission and reception modes.

16. A communication system comprising the transmitter of claim 13 or the receiver of claim 14 and embodied as a radio communication system, a line-connected communication system, or a hybrid communication system with radio components, optical waveguide components and/or line-connected components, said communication system including one transmitter and one receiver assigned to subscribers, with variable transmission and reception modes.

17. A broadcasting communication system using the method synchronizing at least one or more receivers to a transmitter within a transmission system with the use of a data stream with guard intervals, comprising the steps of inserting with the transmitter a special synchronization train into the data stream at a beginning of a transmission, said special synchronization train estimating a chronological position of a signal to be received and/or estimating a center frequency error between the transmitter and the receiver; forming the synchronization train of at least two different symbol sequences which are transmitted in alternation periodically; ascertaining the chronological position of the signal and/or the center frequency error between the transmitter and the receiver from a composite term of various symbol sequences within a predetermined interval; for a block synchronization using total metrics of at least two different symbol sequences used as the synchronization train; and selecting as a beginning of a block, whichever index minimizes the total metrics within the predetermined interval and embodied as a radio communication system, a line-connected communication system, or a hybrid communication system with radio components, optical waveguide components and/or line-connected components, said broadcast communication system being formed so that an association of a transmission and a reception mode is finally specified.

18. A broadcasting communication system comprising the transmitter of claim 13 or the receiver of claim 14 and embodied as a radio communication system, a line-connected communication system, or a hybrid communication system with radio components, optical waveguide components and/or line-connected components, said broadcast communication system being formed so that an association of a transmission and a reception mode is finally specified.

* * * * *